US009123253B2

(12) United States Patent
Noh

(10) Patent No.: US 9,123,253 B2
(45) Date of Patent: Sep. 1, 2015

(54) PARKING ASSISTANCE APPARATUS AND PARKING ASSISTANCE METHOD THEREOF

(71) Applicant: Tae Bong Noh, Yongin-si (KR)

(72) Inventor: Tae Bong Noh, Yongin-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 97 days.

(21) Appl. No.: 13/962,281

(22) Filed: Aug. 8, 2013

(65) Prior Publication Data
US 2014/0046544 A1 Feb. 13, 2014

(30) Foreign Application Priority Data
Aug. 10, 2012 (KR) .................. 10-2012-0087584

(51) Int. Cl.
| A01B 69/00 | (2006.01) |
| B62D 6/00 | (2006.01) |
| B62D 11/00 | (2006.01) |
| B63G 8/20 | (2006.01) |
| B63H 25/04 | (2006.01) |
| G05D 1/00 | (2006.01) |
| G06F 7/00 | (2006.01) |
| G06F 17/00 | (2006.01) |
| G06F 19/00 | (2011.01) |
| G08G 1/16 | (2006.01) |
| B62D 15/02 | (2006.01) |
| B60W 10/184 | (2012.01) |
| B60W 10/20 | (2006.01) |
| B60W 30/06 | (2006.01) |
| B60W 50/14 | (2012.01) |

(52) U.S. Cl.
CPC ............. *G08G 1/168* (2013.01); *B60W 10/184* (2013.01); *B60W 10/20* (2013.01); *B60W 30/06* (2013.01); *B62D 15/028* (2013.01); *B62D 15/0285* (2013.01); *B60W 2050/146* (2013.01); *B60W 2550/10* (2013.01)

(58) Field of Classification Search
CPC ..................... B62D 15/00; B60Q 9/00; B60Q 9/002–9/008; B60W 2250/10
USPC .......................... 701/41; 340/932.2, 937, 943
See application file for complete search history.

(56) References Cited

U.S. PATENT DOCUMENTS

| 2005/0085984 | A1* | 4/2005 | Uhler et al. ..................... 701/70 |
| 2010/0049413 | A1* | 2/2010 | Makino et al. .................. 701/65 |
| 2011/0006916 | A1* | 1/2011 | Toledo ........................ 340/932.2 |

FOREIGN PATENT DOCUMENTS

KR 10-2006-0083681 A 7/2006

* cited by examiner

Primary Examiner — Imran Mustafa
(74) Attorney, Agent, or Firm — Ladas & Parry, LLP

(57) ABSTRACT

Disclosed herein are a parking assistance apparatus and a parking assistance method thereof. The parking assistance apparatus includes a sensing unit sensing at least one of forward and backward access distances to a current surrounding object, a controller performing an electronic parking brake operation and including predetermined forward and backward access distance ranges to a reference surrounding object, a first judgment unit judging whether or not at least one access distance deviates from at least one access distance range, a display unit displaying the at least one access distance and the at least one access distance range, if the first judgment unit judges that the at least one access distance deviates from the at least one access distance range, and a steering driving unit driving an electronic steering driving apparatus until the at least one access distance enters the at least one access distance range.

14 Claims, 13 Drawing Sheets

PARKING ASSISTANCE APPARATUS AND PARKING ASSISTANCE METHOD THEREOF

CROSS-REFERENCE TO RELATED APPLICATION

This application claims priority to Korean Patent Application No. 10-2012-0087584, filed on Aug. 10, 2012 in the Korean Intellectual Property Office, the disclosure of which is incorporated herein by reference in its entirety.

BACKGROUND

1. Field

Embodiments of the present invention relate to a parking assistance apparatus and a parking assistance method thereof.

2. Description of the Related Art

In general, a parking assistance apparatus is provided to guide a driver to enable convenient parking.

However, if a vehicle nearly accesses a surrounding object during parking, the conventional parking assistance apparatus is limited in sensing an access situation with the surrounding object.

Therefore, research is underway on an improved parking assistance apparatus which effectively displays an access situation with surrounding objects to prevent collision of a vehicle with the surrounding objects and thus improves reliability in parking and convenience of parking.

SUMMARY

Therefore, it is an aspect of the present invention to provide a parking assistance apparatus and a parking assistance method thereof which may improve reliability in parking.

It is another aspect of the present invention to provide a parking assistance apparatus and a parking assistance method thereof which may improve convenience of parking.

Additional aspects of the invention will be set forth in part in the description which follows and, in part, will be obvious from the description, or may be learned by practice of the invention.

In accordance with one aspect of the present invention, a parking assistance apparatus includes a sensing unit sensing at least one of a forward access distance and a backward access distance to a current surrounding object according to forward driving and backward driving of a vehicle during parking of the vehicle, a controller performing an electronic parking brake operation using an electronic parking brake driving apparatus during parking of the vehicle and including predetermined forward access distance range and backward access distance range to a reference surrounding object, a first judgment unit judging whether or not at least one of the forward access distance and the backward access distance to the current surrounding object, sensed by the sensing unit, deviates from at least one of the forward access distance range and the backward access distance range to the reference surrounding object under control of the controller, a display unit displaying the at least one access distance and the at least one access distance range, if the first judgment unit judges that the at least one of the forward access distance and the backward access distance to the current surrounding object deviates from the at least one of the forward access distance range and the backward access distance range to the reference surrounding object, and a steering driving unit driving an electronic steering driving apparatus under control of the controller until the at least one access distance enters the at least one access distance range, based on the at least one access distance and the at least one access distance range, displayed on the display unit.

The display unit may include at least one of a human machine interface (HMI) module and a head-up display (HUD) module.

The parking assistance apparatus may further include a first identification unit identifying a current access distance situation, if the first judgment unit judges that the at least one of the forward access distance and the backward access distance to the current surrounding object deviates from the at least one of the forward access distance range and the backward access distance range to the reference surrounding object.

The first identification unit may include at least one of an alarm, a speaker, a light emitting member, a human machine interface (HMI) module, and a head-up display (HUD) module.

The parking assistance apparatus may further include a second judgment unit judging whether or not the at least one access distance enters the at least one access distance range, when the steering driving unit drives the electronic steering driving apparatus under control of the controller.

The parking assistance apparatus may further include a second identification unit identifying a current entry situation, if the second judgment unit judges that the at least one access distance enters the at least one access distance range.

The second identification unit may include at least one of an alarm, a speaker, a light emitting member, a human machine interface (HMI) module, and a head-up display (HUD) module.

In accordance with another aspect of the present invention, a parking assistance method includes causing a sensing unit to sense at least one of a forward access distance and a backward access distance to a current surrounding object according to forward driving and backward driving of a vehicle during parking of the vehicle, causing a first judgment unit to judge whether or not at least one of the forward access distance and the backward access distance to the current surrounding object, sensed by the sensing unit, deviates from at least one of the forward access distance range and the backward access distance range to a reference surrounding object, predetermined in a controller, under control of the controller, causing a display unit to display the at least one access distance and the at least one access distance range, if the first judgment unit judges that the at least one of the forward access distance and the backward access distance to the current surrounding object deviates from the at least one of the forward access distance range and the backward access distance range to the reference surrounding object, and causing a steering driving unit to drive an electronic steering driving apparatus under control of the controller until the at least one access distance enters the at least one access distance range, based on the at least one access distance and the at least one access distance range, displayed on the display unit.

The display through the display unit may be carried out through at least one of a human machine interface (HMI) message display operation of an HMI module and a head-up display (HUD) message display operation of an HUD module.

The parking assistance method may further include, after the judgment through the first judgment unit, causing a first identification unit to identify a current access distance situation, if the first judgment unit judges that the at least one of the forward access distance and the backward access distance to the current surrounding object deviates from the at least one of the forward access distance range and the backward access distance range to the reference surrounding object.

The identification through the first identification unit may be carried out through at least one of an alarm operation of an alarm, a voice operation of a speaker, a light emitting operation of a light emitting member, a human machine interface (HMI) message display operation of an HMI module and a head-up display (HUD) message display operation of an HUD module.

The parking assistance method may further include, after the display through the display unit, causing a second judgment unit to judge whether or not the at least one access distance enters the at least one access distance range, when the steering driving unit drives the electronic steering driving apparatus under control of the controller.

The parking assistance method may further include, after the judgment through the second judgment unit, causing a second identification unit to identify a current entry situation, if the second judgment unit judges that the at least one access distance enters the at least one access distance range.

The identification through the second identification unit may be carried out through at least one of an alarm operation of an alarm, a voice operation of a speaker, a light emitting operation of a light emitting member, a human machine interface (HMI) message display operation of an HMI module and a head-up display (HUD) message display operation of an HUD module.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
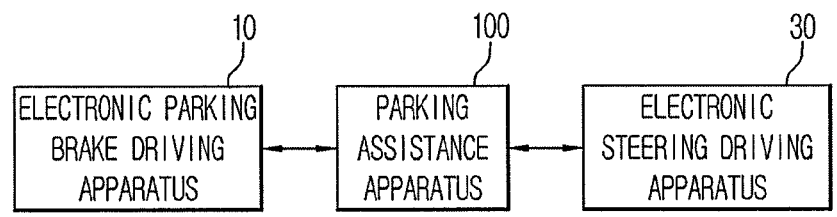
FIG. 1 is a block diagram illustrating a state in which an electronic parking brake driving apparatus and an electronic steering driving apparatus are connected to a parking assistance apparatus in accordance with one embodiment of the present invention.

Reference will now be made in detail to the embodiments of the present invention, examples of which are illustrated in the accompanying drawings, wherein like reference numerals refer to like elements throughout.

<Embodiment 1>

FIG. 1 is a block diagram illustrating a state in which an electronic parking brake driving apparatus and an electronic steering driving apparatus are connected to a parking assistance apparatus in accordance with one embodiment of the present invention.

Figure 2:
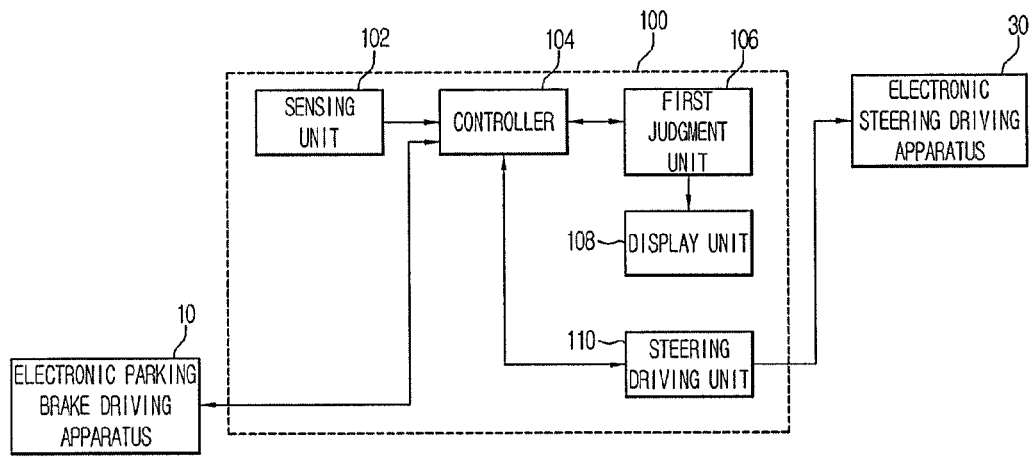
FIG. 2 is a block diagram illustrating one example of connection of the electronic parking brake driving apparatus and the electronic steering driving apparatus to the parking assistance apparatus in accordance with the embodiment of the present invention.

FIG. 2 is a block diagram illustrating one example of connection of the electronic parking brake driving apparatus and the electronic steering driving apparatus to the parking assistance apparatus in accordance with the embodiment of the present invention.

With reference to FIGS. 1 and 2, a parking assistance apparatus 100 in accordance with this embodiment of the present invention includes a sensing unit 102, a controller 104, a first judgment unit 106, a display unit 108, and a steering driving unit 110.

The sensing unit 102 serves to sense at least one of a forward access distance and a backward access distance to a current surrounding object according to forward driving and backward driving of a vehicle during parking of the vehicle.

The sensing unit 102 may include at least one of an optical camera, an ultrasonic sensor, a radar sensor, and an infrared sensor.

The controller 104 serves to perform an electronic parking brake operation using an electronic parking brake driving apparatus 10 during parking of the vehicle and includes predetermined forward access distance range and backward access distance range to a reference surrounding object.

The first judgment unit 106 serves to judge whether or not at least one of the forward access distance and the backward access distance to the current surrounding object, sensed by the sensing unit 102, deviates from at least one of the forward access distance range and the backward access distance range to the reference surrounding object under control of the controller 104.

For example, the first judgment unit 106 may judge whether or not at least one of the forward access distance and the backward access distance to the current surrounding object, sensed by the sensing unit 102, is longer than at least one of the forward access distance range and the backward access distance range to the reference surrounding object under control of the controller 104.

Here, the controller 104 and the first judgment unit 106 may include a general electric control unit (ECU, not shown) to control and judge the overall operation of a vehicle as a main computer applied to the vehicle or a general micro control unit (MCU, not shown) having a processor, a memory, and an I/O device within a single chip to control and judge the overall operation of a vehicle. However, the disclosure of the present invention is not limited thereto, and any control unit and judgment unit to control and judge the overall operation of a vehicle may be used.

The controller 104 and the first judgment unit 106 may be an integrated ECU (not shown) or MCU (not shown), or may be separated ECUs (not shown) or MCUs (not shown).

The display unit 108 serves to display the at least one access distance and the at least one access distance range, if the first judgment unit 106 judges that the at least one of the forward access distance and the backward access distance to the current surrounding object deviates from the at least one of the forward access distance range and the backward access distance range to the reference surrounding object.

The steering driving unit 110 serves to drive an electronic steering driving apparatus 30 under control of the controller 104 until the at least one access distance enters the at least one access distance range, based on the at least one access distance and the at least one access distance range, displayed on the display unit 108.

The display unit 108 may include at least one of a human machine interface (HMI) module (not shown) and a head-up display (HUD) module (not shown) and, thus, exemplarily display at least one of an HMI shift message and an HUD shift message of "Automatic steering in progress. Backward access distance is 86 cm. Please shift into forward." or "Automatic steering in progress. Forward access distance is 86 cm. Please shift into reverse."

Hereinafter, a parking assistance method using the parking assistance apparatus 100 in accordance with this embodiment of the present invention will be described with reference to FIGS. 3 and 4.

Figure 3:
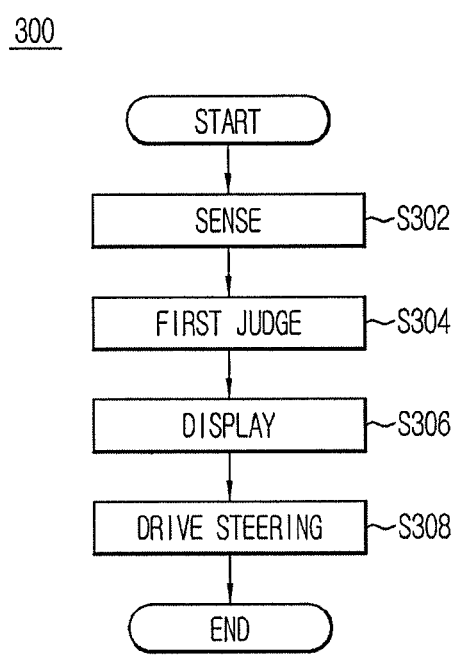
FIG. 3 is a flowchart illustrating one example of a parking assistance method of the parking assistance apparatus in accordance with the embodiment of the present invention.
Figure 4:
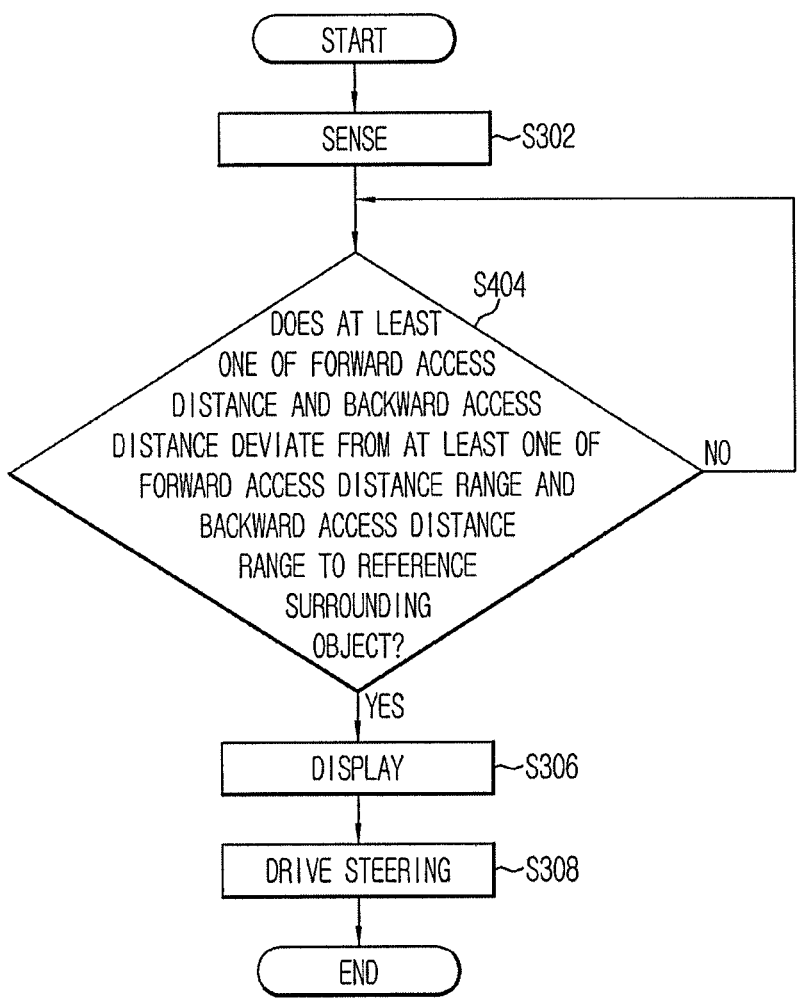
FIG. 4 is a flowchart illustrating another example of the parking assistance method of the parking assistance apparatus in accordance with the embodiment of the present invention.

FIG. 3 is a flowchart illustrating one example of the parking assistance method of the parking assistance apparatus in accordance with this embodiment of the present invention, and FIG. 4 is a flowchart illustrating another example of the parking assistance method of the parking assistance apparatus in accordance with this embodiment of the present invention.

With reference to FIGS. 3 and 4, the parking assistance method 300 or 400 of the parking assistance apparatus 100 (in FIGS. 1 and 2) in accordance with this embodiment of the present invention includes sensing (Operation S302), first judgment (Operation S304), display (Operation S306), and steering driving (Operation S308).

First, in the sensing (Operation S302), the sensing unit 102 (in FIG. 2) senses at least one of a forward access distance and a backward access distance to a current surrounding object according to forward driving and backward driving of a vehicle during parking of the vehicle.

In the sensing (Operation S302), the sensing unit 102 (in FIG. 2) may include at least one of an optical camera, an ultrasonic sensor, a radar sensor, and an infrared sensor.

Thereafter, in the first judgment (S304), the first judgment unit 106 (in FIG. 2) judges whether or not at least one of the forward access distance and the backward access distance to the current surrounding object, sensed by the sensing unit 102 (in FIG. 2), deviates from at least one of a forward access distance range and a backward access distance range to a reference surrounding object, predetermined in the controller 104 (in FIG. 2), under control of the controller 104 (in FIG. 2).

For example, as exemplarily shown in FIG. 4, in the first judgment (S404), the first judgment unit 106 (in FIG. 2) may judge whether or not at least one of the forward access distance and the backward access distance to the current surrounding object, sensed by the sensing unit 102 (in FIG. 2), is longer than at least one of the forward access distance range and the backward access distance range to the reference surrounding object, predetermined in the controller 104 (in FIG. 2), under control of the controller 104 (in FIG. 2).

In the display (Operation S306), if the first judgment unit 106 (in FIG. 2) judges that at least one of the forward access distance and the backward access distance to the current surrounding object deviates from at least one of the forward access distance range and the backward access distance range to the reference surrounding object, the display unit 108 (in FIG. 2) displays the at least one access distance and the at least one access distance range.

In the display (Operation S306), although not shown in the drawings, the display 108 (in FIG. 2) may display the at least one access distance and the at least one access distance range through at least one of an HMI message display operation of an HMI module (not shown) and an HUD message display operation of an HUD module (not shown).

Finally, in the steering driving (Operation S308), the steering driving unit 110 (in FIG. 2) drives the electronic steering driving apparatus 30 (in FIGS. 1 and 2) under control of the controller 104 (in FIG. 2) until the at least one access distance enters the at least one access distance range, based on the at least one access distance and the at least one access distance range, displayed on the display unit 108 (in FIG. 2).

In the display (Operation S306), the display unit 108 (in FIG. 2) may include at least one of a human machine interface (HMI) module (not shown) and a head-up display (HUD) module (not shown) and, thus, exemplarily display at least one of an HMI shift message and an HUD shift message of "Automatic steering in progress. Backward access distance is 86 cm. Please shift into forward." or "Automatic steering in progress. Forward access distance is 86 cm. Please shift into reverse."

As described above, the parking assistance apparatus 100 in accordance with this embodiment of the present invention includes the sensing unit 102, the controller 104, the first judgment unit 106, the display unit 108, and the steering driving unit 110.

Therefore, in the parking assistance apparatus 100 and the parking assistance method 300 or 400 in accordance with this embodiment of the present invention, the forward access distance to the current surrounding object or the backward access distance to the current surrounding object, displayed on the display unit 108, may be recognized and, thus, collision of the vehicle with the current surrounding object due to contact with the current surrounding object during parking may be prevented and reliability of parking may be improved.

<Embodiment 2>

Figure 5:
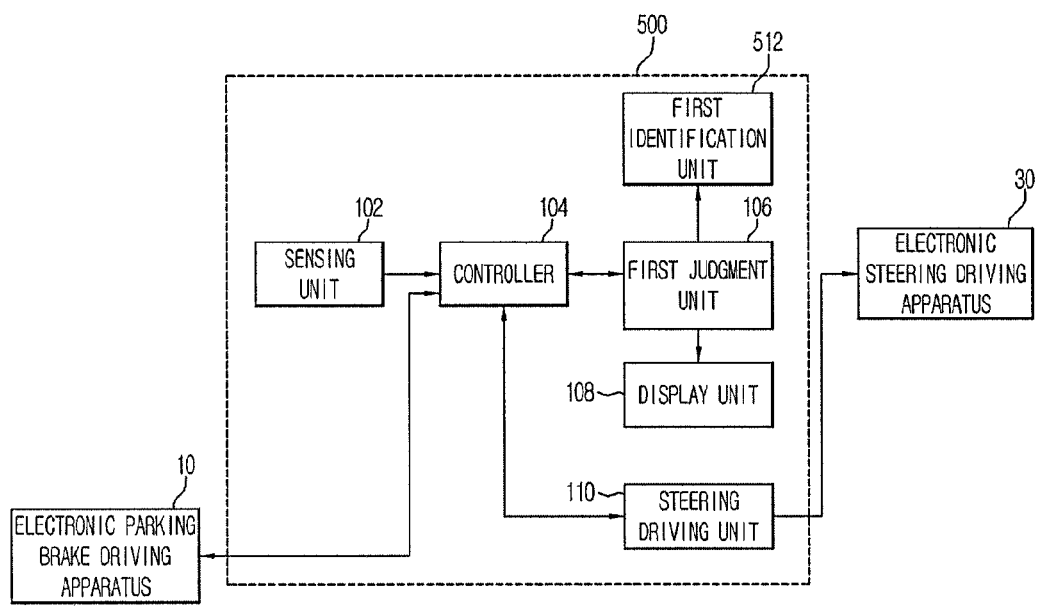
FIG. 5 is a block diagram illustrating a state in which an electronic parking brake driving apparatus and an electronic steering driving apparatus are connected to a parking assistance apparatus in accordance with another embodiment of the present invention.

FIG. 5 is a block diagram illustrating a state in which an electronic parking brake driving apparatus and an electronic steering driving apparatus are connected to a parking assistance apparatus in accordance with another embodiment of the present invention.

With reference to FIG. 5, a parking assistance apparatus 500 in accordance with this embodiment of the present invention includes a sensing unit 102, a controller 104, a first judgment unit 106, a display unit 108, and a steering driving unit 110, in the same manner as the parking assistance apparatus 100 in accordance with the earlier embodiment shown in FIGS. 1 to 4.

Functions and organic connection relations of the respective elements of the parking assistance apparatus 500 in accordance with this embodiment may be the same as those of the parking assistance apparatus 100 in accordance with the earlier embodiment shown in FIGS. 1 to 4, and a detailed description thereof will thus be omitted.

The parking assistance apparatus 500 in accordance with this embodiment of the present invention further includes a first identification unit 512.

That is, the first identification unit 512 serves to identify a current access distance situation, if the first judgment unit 106 judges that at least one of the forward access distance and the backward access distance to the current surrounding object deviates from at least one of the forward access distance range and the backward access distance range to the reference surrounding object.

Here, although not shown in the drawings, the first identification unit 512 may include at least one of an alarm (not shown), a speaker (not shown), and a light emitting member (not shown) provided to allow a driver to identify information or state of a vehicle, and at least one of a human machine interface (HMI) module (not shown) and a head-up display (HUD) module (not shown) mounted to form an interface between a user and a machine to allow a driver to recognize information or state of a vehicle, and, thus identify the current access distance situation through at least one of an alarm operation of the alarm (not shown), a voice operation of the speaker (not shown), a light emitting operation of the light emitting member (not shown), an HMI message display operation of the HMI module (not shown) and an HUD message display operation of the HUD module (not shown).

Hereinafter, a parking assistance method using the parking assistance apparatus 500 in accordance with this embodiment of the present invention will be described with reference to FIGS. 6 and 7.

Figure 6:
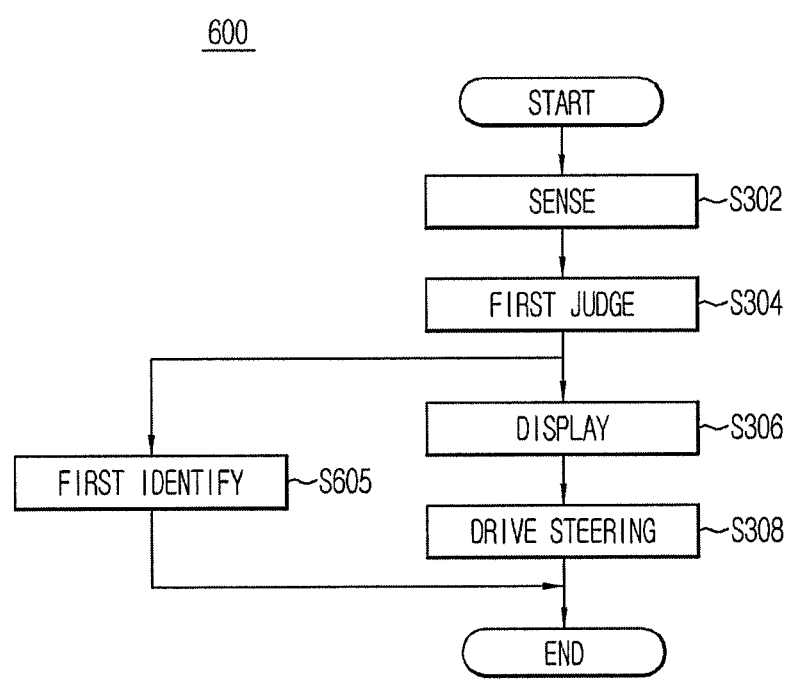
FIG. 6 is a flowchart illustrating one example of a parking assistance method of the parking assistance apparatus in accordance with the embodiment of the present invention.
Figure 7:
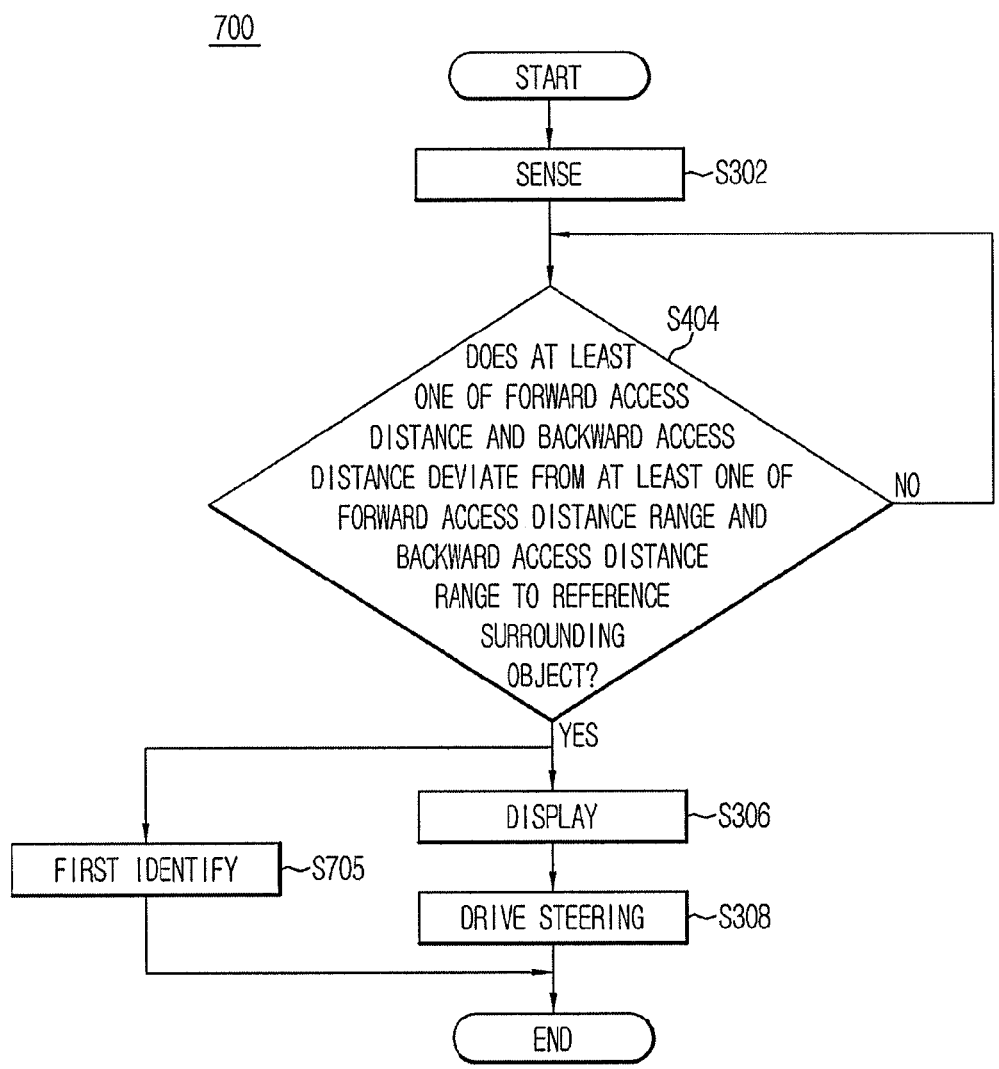
FIG. 7 is a flowchart illustrating another example of the parking assistance method of the parking assistance apparatus in accordance with the embodiment of the present invention.

FIG. 6 is a flowchart illustrating one example of the parking assistance method of the parking assistance apparatus in accordance with this embodiment of the present invention, and FIG. 7 is a flowchart illustrating another example of the parking assistance method of the parking assistance apparatus in accordance with this embodiment of the present invention.

With reference to FIGS. 6 and 7, the parking assistance method 600 or 700 of the parking assistance apparatus 500 (in FIG. 5) in accordance with this embodiment of the present invention includes sensing (Operation S302), first judgment (Operation S304), first identification (Operation S605 or S705), display (Operation S306), and steering driving (Operation S308).

First, in the sensing (Operation S302), the sensing unit 102 (in FIG. 5) senses at least one of a forward access distance and a backward access distance to a current surrounding object according to forward driving and backward driving of a vehicle during parking of the vehicle.

In the sensing (Operation S302), the sensing unit 102 (in FIG. 5) may include at least one of an optical camera, an ultrasonic sensor, a radar sensor, and an infrared sensor.

Thereafter, in the first judgment (S304), the first judgment unit 106 (in FIG. 5) judges whether or not at least one of the forward access distance and the backward access distance to the current surrounding object, sensed by the sensing unit 102 (in FIG. 5), deviates from at least one of a forward access distance range and a backward access distance range to a reference surrounding object, predetermined in the controller 104 (in FIG. 5), under control of the controller 104 (in FIG. 5).

For example, as exemplarily shown in FIG. 7, in the first judgment (S404), the first judgment unit 106 (in FIG. 5) may judge whether or not at least one of the forward access distance and the backward access distance to the current surrounding object, sensed by the sensing unit 102 (in FIG. 5), is longer than at least one of the forward access distance range and the backward access distance range to the reference surrounding object, predetermined in the controller 104 (in FIG. 5), under control of the controller 104 (in FIG. 5).

Thereafter, in the first identification (Operation S605 or S705), the first identification unit 512 (in FIG. 5) identifies a current access distance situation, if the first judgment unit 106 (in FIG. 5) judges that at least one of the forward access distance and the backward access distance to the current surrounding object deviates from at least one of the forward access distance range and the backward access distance range to the reference surrounding object.

Here, in the first identification (Operation S605 or S705), although not shown in the drawings, the first identification unit 512 (in FIG. 5) may include at least one of an alarm (not shown), a speaker (not shown), and a light emitting member (not shown) provided to allow a driver to identify information or state of a vehicle, and at least one of a human machine interface (HMI) module (not shown) and a head-up display (HUD) module (not shown) mounted to form an interface between a user and a machine to allow a driver to recognize information or state of a vehicle, and, thus identify the current access distance situation through at least one of an alarm operation of the alarm (not shown), a voice operation of the speaker (not shown), a light emitting operation of the light emitting member (not shown), an HMI message display operation of the HMI module (not shown) and an HUD message display operation of the HUD module (not shown).

Thereafter, in the display (Operation S306), if the first judgment unit 106 (in FIG. 5) judges that at least one of the forward access distance and the backward access distance to the current surrounding object deviates from at least one of the forward access distance range and the backward access distance range to the reference surrounding object, the display unit 108 (in FIG. 5) displays the at least one access distance and the at least one access distance range.

Finally, in the steering driving (Operation S308), the steering driving unit 110 (in FIG. 5) drives the electronic steering driving apparatus 30 (in FIG. 5) under control of the controller 104 (in FIG. 5) until the at least one access distance enters the at least one access distance range, based on the at least one access distance and the at least one access distance range, displayed on the display unit 108 (in FIG. 5).

In the display (Operation S306), the display unit 108 (in FIG. 5) may include at least one of a human machine interface (HMI) module (not shown) and a head-up display (HUD) module (not shown) and, thus, exemplarily display at least one of an HMI shift message and an HUD shift message of "Automatic steering in progress. Backward access distance is 86 cm. Please shift into forward." or "Automatic steering in progress. Forward access distance is 86 cm. Please shift into reverse."

As described above, the parking assistance apparatus 500 in accordance with this embodiment of the present invention includes the sensing unit 102, the controller 104, the first judgment unit 106, the display unit 108, the steering driving unit 110, and the first identification unit 512.

Therefore, in the parking assistance apparatus 500 and the parking assistance method 600 or 700 in accordance with this embodiment of the present invention, the forward access distance to the current surrounding object or the backward access distance to the current surrounding object, displayed on the display unit 108, may be recognized and, thus, collision of the vehicle with the current surrounding object due to contact with the current surrounding object during parking may be prevented and reliability of parking may be improved.

Further, in the parking assistance apparatus 500 and the parking assistance method 600 or 700 in accordance with this embodiment of the present invention, the first identification unit 512 may identify a current access distance situation and, thus convenience in parking may be improved.

<Embodiment 3>

Figure 8:
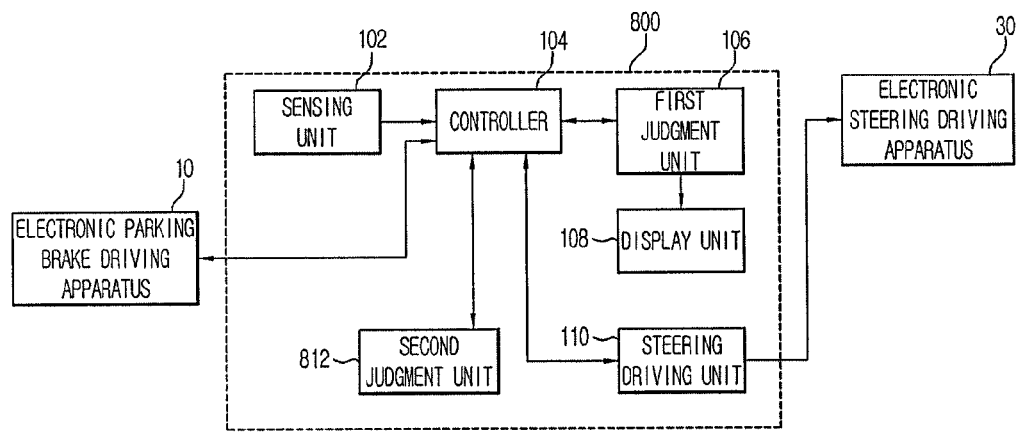
FIG. 8 is a block diagram illustrating a state in which an electronic parking brake driving apparatus and an electronic steering driving apparatus are connected to a parking assistance apparatus in accordance with another embodiment of the present invention.

FIG. 8 is a block diagram illustrating a state in which an electronic parking brake driving apparatus and an electronic steering driving apparatus are connected to a parking assistance apparatus in accordance with another embodiment of the present invention.

With reference to FIG. 8, a parking assistance apparatus 800 in accordance with this embodiment of the present invention includes a sensing unit 102, a controller 104, a first judgment unit 106, a display unit 108, and a steering driving unit 110, in the same manner as the parking assistance apparatus 100 in accordance with the earlier embodiment shown in FIGS. 1 to 4.

Functions and organic connection relations of the respective elements of the parking assistance apparatus 800 in accordance with this embodiment may be the same as those of the parking assistance apparatus 100 in accordance with the earlier embodiment shown in FIGS. 1 to 4, and a detailed description thereof will thus be omitted.

The parking assistance apparatus 800 in accordance with this embodiment of the present invention further includes a second judgment unit 812.

That is, the second judgment unit 812 serves to judge whether or not at least one access distance enters at least one access distance range, if the steering driving unit 110 drives an electronic steering driving apparatus 30 under control of the controller 104.

Hereinafter, a parking assistance method using the parking assistance apparatus 800 in accordance with this embodiment of the present invention will be described with reference to FIGS. 9 and 10.

Figure 9:
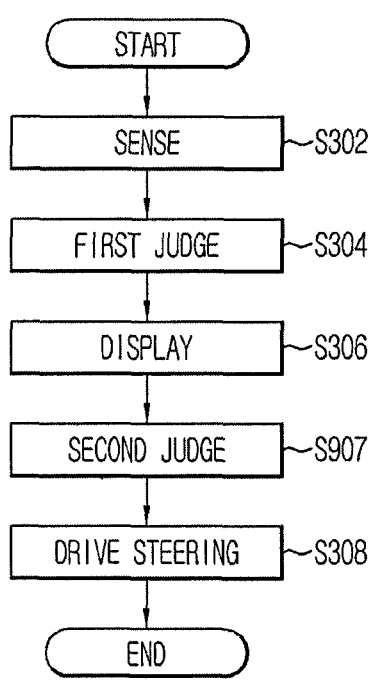
FIG. 9 is a flowchart illustrating one example of a parking assistance method of the parking assistance apparatus in accordance with the embodiment of the present invention.
Figure 10:
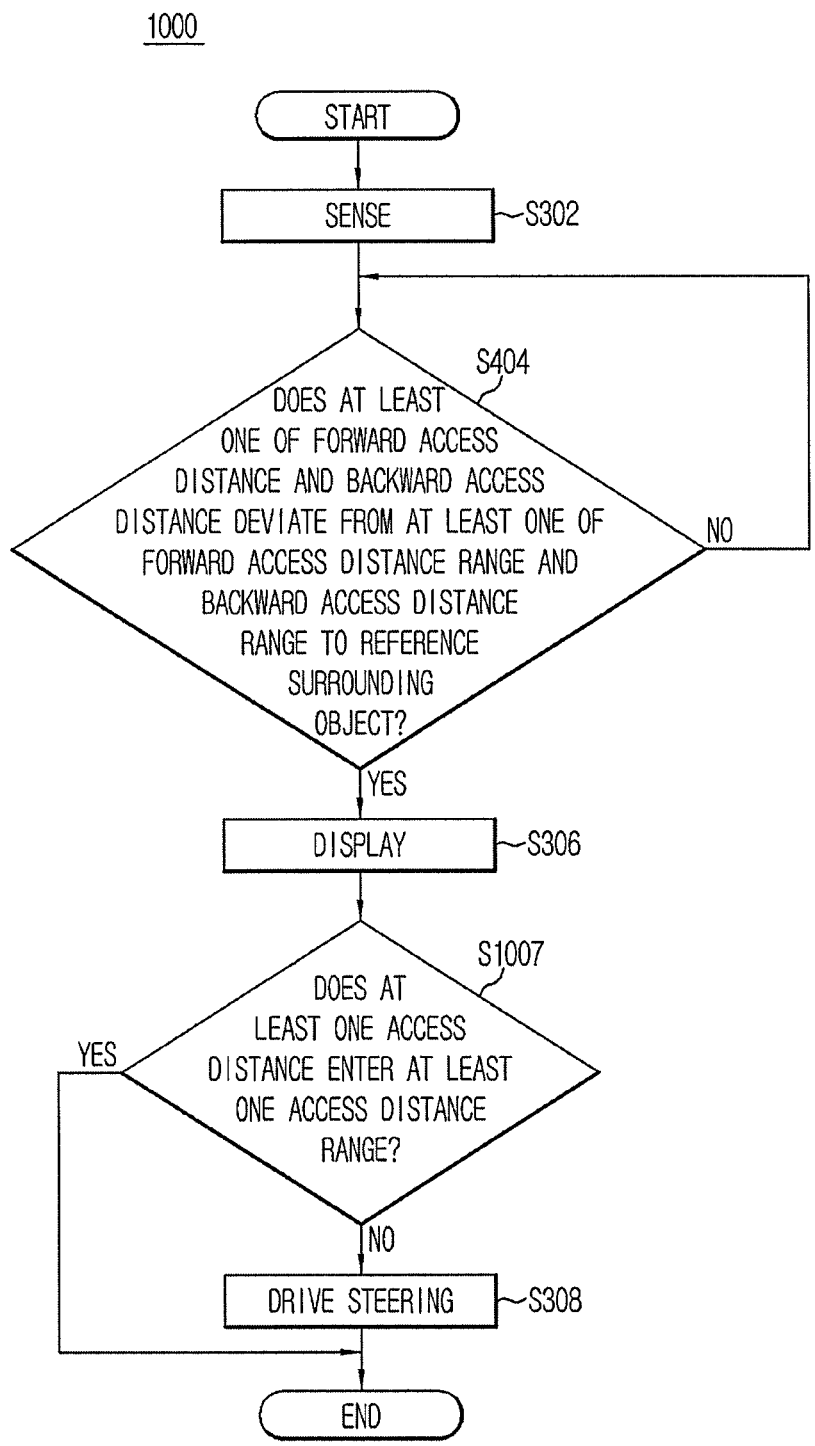
FIG. 10 is a flowchart illustrating another example of the parking assistance method of the parking assistance apparatus in accordance with the embodiment of the present invention.

FIG. 9 is a flowchart illustrating one example of the parking assistance method of the parking assistance apparatus in accordance with this embodiment of the present invention, and FIG. 10 is a flowchart illustrating another example of the parking assistance method of the parking assistance apparatus in accordance with this embodiment of the present invention.

With reference to FIGS. 9 and 10, the parking assistance method 900 or 1000 of the parking assistance apparatus 800 (in FIG. 8) in accordance with this embodiment of the present invention includes sensing (Operation S302), first judgment (Operation S304), display (Operation S306), second judgment (Operation S907 or S1007), and steering driving (Operation S308).

First, in the sensing (Operation S302), the sensing unit 102 (in FIG. 8) senses at least one of a forward access distance and a backward access distance to a current surrounding object according to forward driving and backward driving of a vehicle during parking of the vehicle.

In the sensing (Operation S302), the sensing unit 102 (in FIG. 8) may include at least one of an optical camera, an ultrasonic sensor, a radar sensor, and an infrared sensor.

Thereafter, in the first judgment (S304), the first judgment unit 106 (in FIG. 8) judges whether or not at least one of the forward access distance and the backward access distance to the current surrounding object, sensed by the sensing unit 102 (in FIG. 8), deviates from at least one of a forward access distance range and a backward access distance range to a reference surrounding object, predetermined in the controller 104 (in FIG. 8), under control of the controller 104 (in FIG. 8).

For example, as exemplarily shown in FIG. 10, in the first judgment (S404), the first judgment unit 106 (in FIG. 8) may judge whether or not at least one of the forward access distance and the backward access distance to the current surrounding object, sensed by the sensing unit 102 (in FIG. 8), is longer than at least one of the forward access distance range and the backward access distance range to the reference surrounding object, predetermined in the controller 104 (in FIG. 8), under control of the controller 104 (in FIG. 8).

Thereafter, in the display (Operation S306), if the first judgment unit 106 (in FIG. 8) judges that at least one of the forward access distance and the backward access distance to the current surrounding object deviates from at least one of the forward access distance range and the backward access distance range to the reference surrounding object, the display unit 108 (in FIG. 8) displays the at least one access distance and the at least one access distance range.

Thereafter, in the second judgment (Operation S907 or S1007), the second judgment unit 812 (in FIG. 8) judges whether or not the at least one access distance enters the at least one access distance range, if the steering driving unit 110 (in FIG. 8) drives an electronic steering driving apparatus 30 (in FIG. 8) under control of the controller 104 (in FIG. 8).

Finally, in the steering driving (Operation S308), the steering driving unit 110 (in FIG. 8) drives the electronic steering driving apparatus 30 (in FIG. 8) under control of the controller 104 (in FIG. 8) until the at least one access distance enters the at least one access distance range, based on the at least one access distance and the at least one access distance range, displayed on the display unit 108 (in FIG. 8).

In the display (Operation S306), the display unit 108 (in FIG. 8) may include at least one of a human machine interface (HMI) module (not shown) and a head-up display (HUD) module (not shown) and, thus, exemplarily display at least one of an HMI shift message and an HUD shift message of "Automatic steering in progress. Backward access distance is 86 cm. Please shift into forward." or "Automatic steering in progress. Forward access distance is 86 cm. Please shift into reverse."

As described above, the parking assistance apparatus 800 in accordance with this embodiment of the present invention includes the sensing unit 102, the controller 104, the first judgment unit 106, the display unit 108, the steering driving unit 110, and the second judgment unit 812.

Therefore, in the parking assistance apparatus 800 and the parking assistance method 900 or 1000 in accordance with this embodiment of the present invention, if the second judgment unit 812 judges that the forward access distance to the current surrounding object or the backward access distance to the current surrounding object enters the forward access distance range to the reference surrounding object or the backward access distance range to the reference surrounding object, a forward access distance entry situation to the current surrounding object or a backward access distance entry situation to the current surrounding object, displayed on the display unit 108, may be recognized and, thus, collision of the vehicle with the current surrounding object due to contact with the current surrounding object during parking may be prevented and reliability of parking may be improved.

<Embodiment 4>

Figure 11:
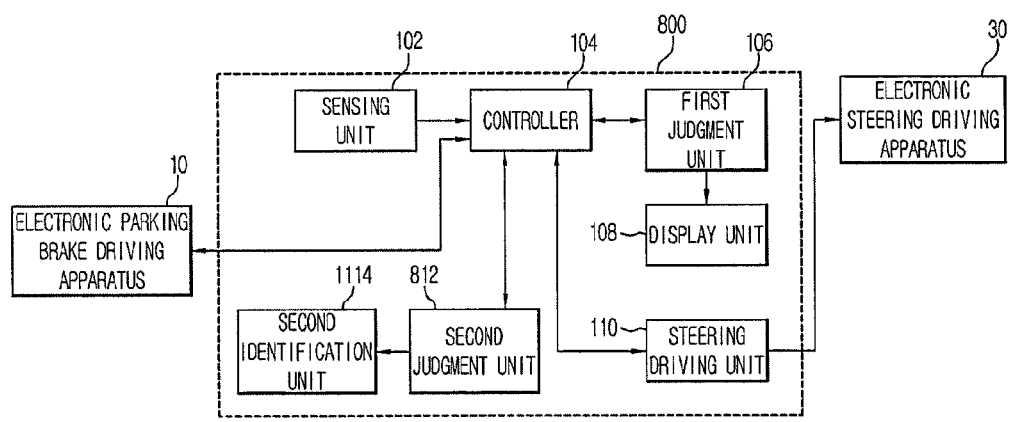
FIG. 11 is a block diagram illustrating a state in which an electronic parking brake driving apparatus and an electronic steering driving apparatus are connected to a parking assistance apparatus in accordance with a further embodiment of the present invention.

FIG. 11 is a block diagram illustrating a state in which an electronic parking brake driving apparatus and an electronic steering driving apparatus are connected to a parking assistance apparatus in accordance with a further embodiment of the present invention.

With reference to FIG. 11, a parking assistance apparatus 1100 in accordance with this embodiment of the present invention includes a sensing unit 102, a controller 104, a first judgment unit 106, a display unit 108, a steering driving unit 110, and a second judgment unit 812, in the same manner as the parking assistance apparatus 800 in accordance with the earlier embodiment shown in FIGS. 8 to 10.

Functions and organic connection relations of the respective elements of the parking assistance apparatus 1100 in accordance with this embodiment may be the same as those of the parking assistance apparatus 800 in accordance with the earlier embodiment shown in FIGS. 8 to 10, and a detailed description thereof will thus be omitted.

The parking assistance apparatus 1100 in accordance with this embodiment of the present invention further includes a second identification unit 1114.

That is, the second identification unit 1114 serves to identify a current entry situation, if the second judgment unit 812 judges that at least one access distance enters at least one access distance range.

Here, although not shown in the drawings, the second identification unit 1114 may include at least one of an alarm (not shown), a speaker (not shown), and a light emitting member (not shown) provided to allow a driver to identify information or state of a vehicle, and at least one of a human machine interface (HMI) module (not shown) and a head-up display (HUD) module (not shown) mounted to form an interface between a user and a machine to allow a driver to recognize information or state of a vehicle, and, thus identify the current entry situation through at least one of an alarm operation of the alarm (not shown), a voice operation of the speaker (not shown), a light emitting operation of the light emitting member (not shown), an HMI message display operation of the HMI module (not shown) and an HUD message display operation of the HUD module (not shown).

Hereinafter, a parking assistance method using the parking assistance apparatus 1100 in accordance with this embodiment of the present invention will be described with reference to FIGS. 12 and 13.

Figure 12:
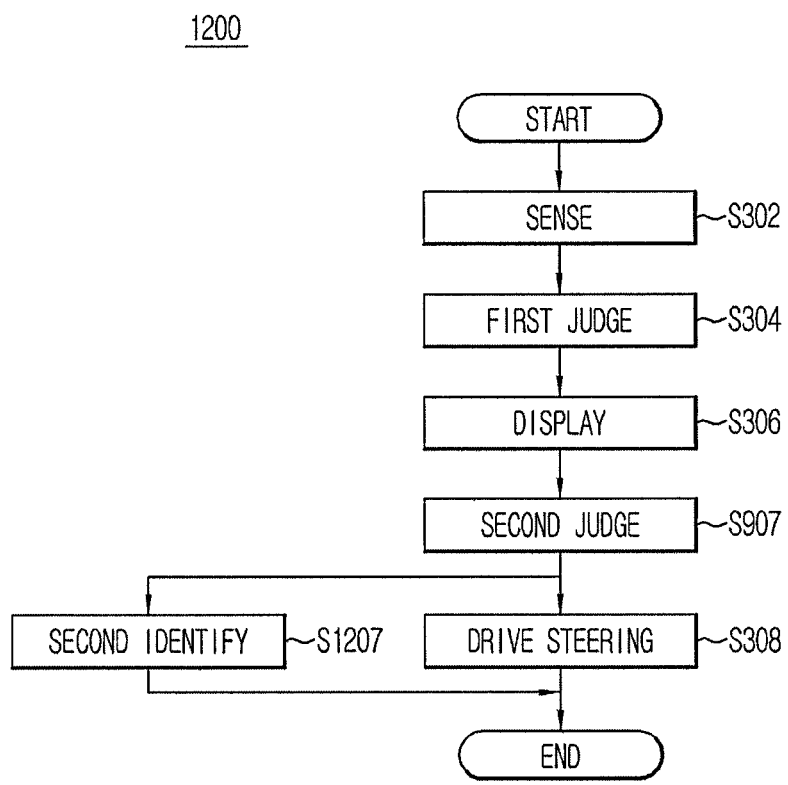
FIG. 12 is a flowchart illustrating one example of a parking assistance method of the parking assistance apparatus in accordance with the embodiment of the present invention.
Figure 13:
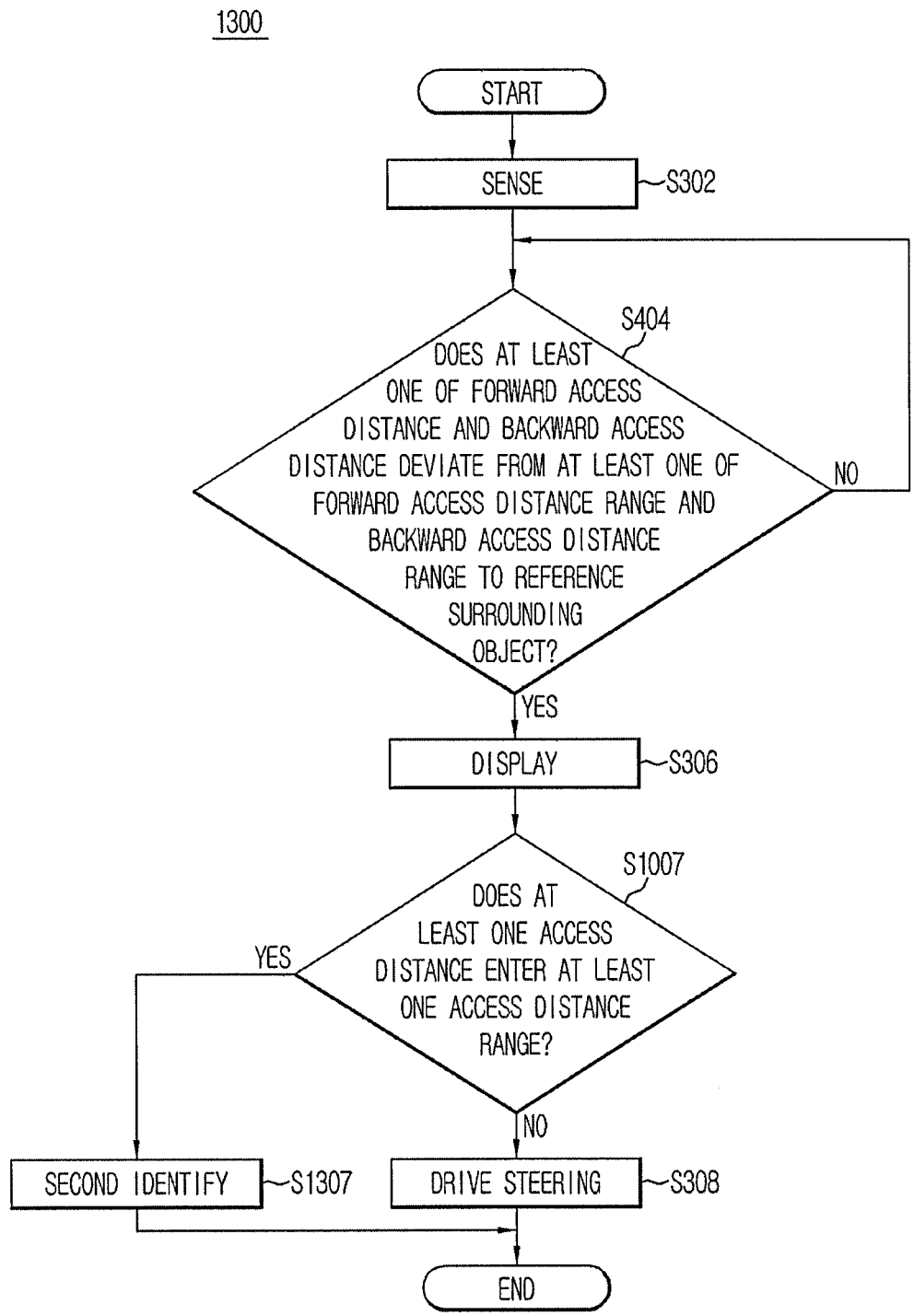
FIG. 13 is a flowchart illustrating another example of the parking assistance method of the parking assistance apparatus in accordance with the embodiment of the present invention.

FIG. 12 is a flowchart illustrating one example of the parking assistance method of the parking assistance apparatus in accordance with this embodiment of the present invention, and FIG. 13 is a flowchart illustrating another example of the parking assistance method of the parking assistance apparatus in accordance with this embodiment of the present invention.

With reference to FIGS. 12 and 13, the parking assistance method 1200 or 1300 of the parking assistance apparatus 1100 (in FIG. 11) in accordance with this embodiment of the present invention includes sensing (Operation S302), first judgment (Operation S304), display (Operation S306), second judgment (Operation S907 or S1007), second identification (Operation S1207 or S1307), and steering driving (Operation S308).

First, in the sensing (Operation S302), the sensing unit 102 (in FIG. 11) senses at least one of a forward access distance and a backward access distance to a current surrounding object according to forward driving and backward driving of a vehicle during parking of the vehicle.

In the sensing (Operation S302), the sensing unit 102 (in FIG. 11) may include at least one of an optical camera, an ultrasonic sensor, a radar sensor, and an infrared sensor.

Thereafter, in the first judgment (S304), the first judgment unit 106 (in FIG. 11) judges whether or not at least one of the forward access distance and the backward access distance to the current surrounding object, sensed by the sensing unit 102 (in FIG. 11), deviates from at least one of a forward access distance range and a backward access distance range to a reference surrounding object, predetermined in the controller 104 (in FIG. 11), under control of the controller 104 (in FIG. 11).

For example, as exemplarily shown in FIG. 13, in the first judgment (S404), the first judgment unit 106 (in FIG. 11) may judge whether or not at least one of the forward access distance and the backward access distance to the current surrounding object, sensed by the sensing unit 102 (in FIG. 11), is longer than at least one of the forward access distance range and the backward access distance range to the reference surrounding object, predetermined in the controller 104 (in FIG. 11), under control of the controller 104 (in FIG. 11).

Thereafter, in the display (Operation S306), if the first judgment unit 106 (in FIG. 11) judges that at least one of the forward access distance and the backward access distance to the current surrounding object deviates from at least one of the forward access distance range and the backward access distance range to the reference surrounding object, the display unit 108 (in FIG. 11) displays the at least one access distance and the at least one access distance range.

Thereafter, in the second judgment (Operation S907 or S1007), the second judgment unit 812 (in FIG. 11) judges whether or not the at least one access distance enters the at least one access distance range, if the steering driving unit 110 (in FIG. 11) drives an electronic steering driving apparatus 30 (in FIG. 11) under control of the controller 104 (in FIG. 11).

Thereafter, in the second identification (Operation S1207 or S1307), the second identification unit 1114 (in FIG. 11) identifies a current entry situation, if the second judgment unit 812 (in FIG. 11) judges that the at least one access distance enters the at least one access distance range.

Here, in the second identification (Operation S1207 or S1307), the second identification unit 1114 (in FIG. 11) may include at least one of an alarm (not shown), a speaker (not shown), and a light emitting member (not shown) provided to allow a driver to identify information or state of a vehicle, and at least one of a human machine interface (HMI) module (not shown) and a head-up display (HUD) module (not shown) mounted to form an interface between a user and a machine to allow a driver to recognize information or state of a vehicle, and, thus identify the current entry situation through at least one of an alarm operation of the alarm (not shown), a voice operation of the speaker (not shown), a light emitting operation of the light emitting member (not shown), an HMI message display operation of the HMI module (not shown) and an HUD message display operation of the HUD module (not shown).

Finally, in the steering driving (Operation S308), the steering driving unit 110 (in FIG. 11) drives the electronic steering driving apparatus 30 (in FIG. 11) under control of the controller 104 (in FIG. 11) until the at least one access distance enters the at least one access distance range, based on the at least one access distance and the at least one access distance range, displayed on the display unit 108 (in FIG. 11).

In the display (Operation S306), the display unit 108 (in FIG. 11) may include at least one of a human machine interface (HMI) module (not shown) and a head-up display (HUD) module (not shown) and, thus, exemplarily display at least one of an HMI shift message and an HUD shift message of "Automatic steering in progress. Backward access distance is 86 cm. Please shift into forward." or "Automatic steering in progress. Forward access distance is 86 cm. Please shift into reverse."

As described above, the parking assistance apparatus 1100 in accordance with this embodiment of the present invention includes the sensing unit 102, the controller 104, the first judgment unit 106, the display unit 108, the steering driving unit 110, the second judgment unit 812, and the second identification unit 1114.

Therefore, in the parking assistance apparatus 1100 and the parking assistance method 1200 or 1300 in accordance with this embodiment of the present invention, if the second judgment unit 812 judges that the forward access distance to the current surrounding object or the backward access distance to the current surrounding object enters the forward access distance range to the reference surrounding object or the backward access distance range to the reference surrounding object, a forward access distance entry situation to the current surrounding object or a backward access distance entry situation to the current surrounding object, displayed on the display unit 108, may be recognized and, thus, collision of the vehicle with the current surrounding object due to contact with the current surrounding object during parking may be prevented and reliability of parking may be improved.

Further, in the parking assistance apparatus 1100 and the parking assistance method 1200 or 1300 in accordance with this embodiment of the present invention, the second identification unit 114 may identify a current access distance situation when the current access distance enters the access distance range to the reference surrounding object and the steering driving unit 110 may drive the electronic steering driving apparatus 30 so as to park the vehicle until the current access distance enters the access distance range to the reference surrounding object, and thus, convenience in parking may be improved.

As is apparent from the above description, a parking assistance apparatus and a parking assistance method thereof in accordance with one embodiment of the present invention have the following effects.

First, reliability of parking may be improved

Second, convenience in parking may be improved.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A parking assistance apparatus comprising:
a sensing unit sensing at least one of a forward access distance and a backward access distance to a current surrounding object according to forward driving and backward driving of a vehicle during parking of the vehicle;
a controller performing an electronic parking brake operation using an electronic parking brake driving apparatus during parking of the vehicle and including predetermined forward access distance range and backward access distance range to a reference surrounding object;
a first judgment unit judging whether or not at least one of the forward access distance and the backward access distance to the current surrounding object, sensed by the sensing unit, deviates from at least one of the forward access distance range and the backward access distance range to the reference surrounding object under control of the controller;
a display unit displaying the at least one access distance and the at least one access distance range, if the first judgment unit judges that the at least one of the forward access distance and the backward access distance to the current surrounding object deviates from the at least one of the forward access distance range and the backward access distance range to the reference surrounding object; and
a steering driving unit driving an electronic steering driving apparatus under control of the controller until the at least one access distance enters the at least one access distance range, based on the at least one access distance and the at least one access distance range, displayed on the display unit.

2. The parking assistance apparatus according to claim 1, wherein the display unit includes at least one of a human machine interface (HMI) module and a head-up display (HUD) module.

3. The parking assistance apparatus according to claim 1, further comprising a first identification unit identifying a current access distance situation, if the first judgment unit judges that the at least one of the forward access distance and the backward access distance to the current surrounding object deviates from the at least one of the forward access distance range and the backward access distance range to the reference surrounding object.

4. The parking assistance apparatus according to claim 3, wherein the first identification unit includes at least one of an alarm, a speaker, a light emitting member, a human machine interface (HMI) module, and a head-up display (HUD) module.

5. The parking assistance apparatus according to claim 1, further comprising a second judgment unit judging whether or not the at least one access distance enters the at least one access distance range, when the steering driving unit drives the electronic steering driving apparatus under control of the controller.

6. The parking assistance apparatus according to claim 5, further comprising a second identification unit identifying a current entry situation, if the second judgment unit judges that the at least one access distance enters the at least one access distance range.

7. The parking assistance apparatus according to claim 6, wherein the second identification unit includes at least one of an alarm, a speaker, a light emitting member, a human machine interface (HMI) module, and a head-up display (HUD) module.

8. A parking assistance method comprising:
causing a sensing unit to sense at least one of a forward access distance and a backward access distance to a current surrounding object according to forward driving and backward driving of a vehicle during parking of the vehicle;
causing a first judgment unit to judge whether or not at least one of the forward access distance and the backward access distance to the current surrounding object, sensed by the sensing unit, deviates from at least one of the forward access distance range and the backward access distance range to a reference surrounding object, predetermined in a controller, under control of the controller;
causing a display unit to display the at least one access distance and the at least one access distance range, if the first judgment unit judges that the at least one of the forward access distance and the backward access distance to the current surrounding object deviates from the at least one of the forward access distance range and the backward access distance range to the reference surrounding object; and
causing a steering driving unit to drive an electronic steering driving apparatus under control of the controller until the at least one access distance enters the at least one access distance range, based on the at least one access distance and the at least one access distance range, displayed on the display unit.

9. The parking assistance method according to claim 8, wherein the display through the display unit is carried out through at least one of a human machine interface (HMI) message display operation of an HMI module and a head-up display (HUD) message display operation of an HUD module.

10. The parking assistance method according to claim 8, further comprising, after the judgment through the first judgment unit, causing a first identification unit to identify a current access distance situation, if the first judgment unit judges that the at least one of the forward access distance and the backward access distance to the current surrounding object deviates from the at least one of the forward access distance range and the backward access distance range to the reference surrounding object.

11. The parking assistance method according to claim 10, wherein the identification through the first identification unit is carried out through at least one of an alarm operation of an alarm, a voice operation of a speaker, a light emitting operation of a light emitting member, a human machine interface (HMI) message display operation of an HMI module and a head-up display (HUD) message display operation of an HUD module.

12. The parking assistance method according to claim 8, further comprising, after the display through the display unit, causing a second judgment unit to judge whether or not the at least one access distance enters the at least one access distance range, when the steering driving unit drives the electronic steering driving apparatus under control of the controller.

13. The parking assistance method according to claim 12, further comprising, after the judgment through the second judgment unit, causing a second identification unit to identify a current entry situation, if the second judgment unit judges that the at least one access distance enters the at least one access distance range.

14. The parking assistance method according to claim 13, wherein the identification through the second identification unit is carried out through at least one of an alarm operation of an alarm, a voice operation of a speaker, a light emitting operation of a light emitting member, a human machine interface (HMI) message display operation of an HMI module and a head-up display (HUD) message display operation of an HUD module.

* * * * *